US012682437B2

(12) United States Patent
Bai et al.

(10) Patent No.: US 12,682,437 B2
(45) Date of Patent: Jul. 14, 2026

(54) METHODS FOR GENERATING CORRECTION FUNCTION, IMAGE CORRECTION METHODS AND APPARATUSES

(71) Applicant: BOE Technology Group Co., Ltd., Beijing (CN)

(72) Inventors: Jiarong Bai, Beijing (CN); Ruijun Dong, Beijing (CN); Na Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/686,575

(22) PCT Filed: Aug. 22, 2022

(86) PCT No.: PCT/CN2022/114002
§ 371 (c)(1),
(2) Date: Feb. 26, 2024

(87) PCT Pub. No.: WO2024/040398
PCT Pub. Date: Feb. 29, 2024

(65) Prior Publication Data
US 2025/0217947 A1 Jul. 3, 2025

(51) Int. Cl.
*G06T 5/80* (2024.01)
*G06T 7/73* (2017.01)
*G06T 7/90* (2017.01)

(52) U.S. Cl.
CPC ................. *G06T 5/80* (2024.01); *G06T 7/73* (2017.01); *G06T 7/90* (2017.01); *G06T 2207/10024* (2013.01)

(58) Field of Classification Search
CPC .... G06T 5/80; G06T 7/73; G06T 7/90; G06T 2207/10024
See application file for complete search history.

(56) References Cited

FOREIGN PATENT DOCUMENTS

CN      103792674 A    5/2014
CN      104423578 A    3/2015
(Continued)

OTHER PUBLICATIONS

PCT/CN2022/114002 international search report dated Jan. 6, 2023.
PCT/CN2022/114002 Written Opinion dated Jan. 6, 2023.

*Primary Examiner* — Hai Tao Sun
*Assistant Examiner* — Thomas John Foster
(74) *Attorney, Agent, or Firm* — IPro, PLLC

(57) ABSTRACT

A method for generating a correction function, an image correction method and apparatuses are provided. The method for generating a correction function includes determining a display device comprising an optical system and a display component, wherein a normal image displayed by the display component forms a distorted image through the optical system, and the distorted image is a virtual image; obtaining sample object-side position coordinates and corresponding sample image-side field-of-view-angle coordinates for the display device, wherein the sample object-side position coordinates are used to represent display positions of sample pixels of the normal image in the display component, and the sample image-side field-of-view-angle coordinates are used to represent field-of-view angles of sample virtual image points in the distorted image corresponding to the sample pixels; generating a correction function based on the sample object-side position coordinates and the sample image-side field-of-view-angle coordinates.

19 Claims, 5 Drawing Sheets

Human eye

(56)         References Cited

FOREIGN PATENT DOCUMENTS

| CN | 103792674 | B | * | 11/2016 |
| CN | 107610044 | A |   | 1/2018 |
| CN | 108876725 | A |   | 11/2018 |
| CN | 109255760 | A | * | 1/2019 |
| CN | 109688392 | A |   | 4/2019 |
| CN | 110189263 | A | * | 8/2019 |
| CN | 111127365 | A |   | 5/2020 |
| CN | 112258399 | A |   | 1/2021 |
| CN | 112381739 | A | * | 2/2021 |
| CN | 113240592 | A |   | 8/2021 |
| CN | 114049281 | A | * | 2/2022 |
| JP | H10327373 | A |   | 12/1998 |

* cited by examiner

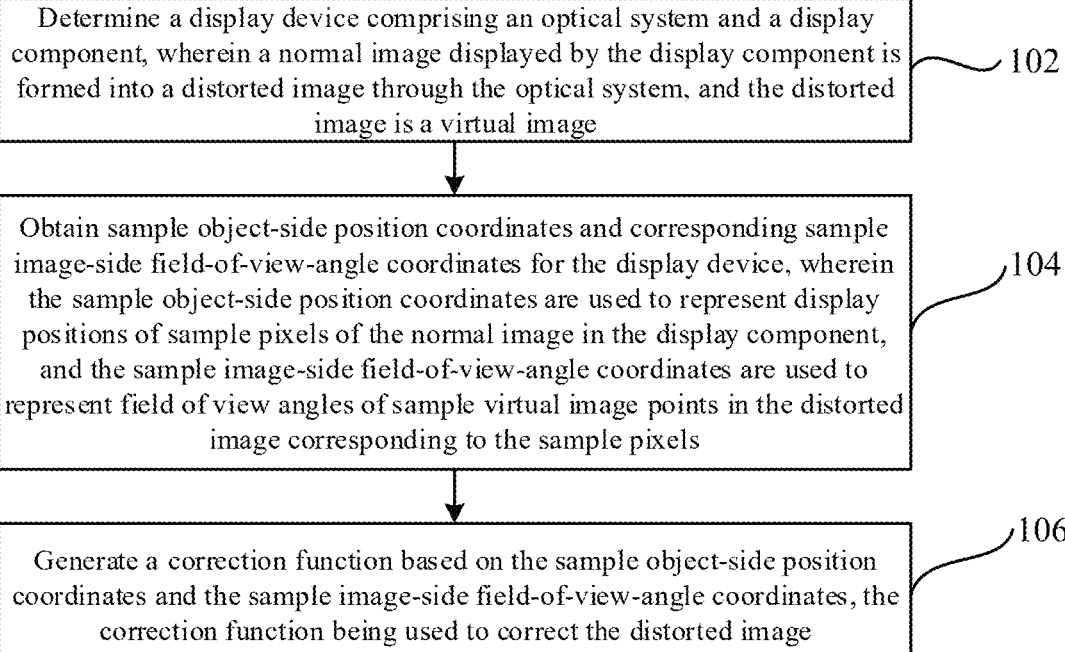

Determine a display device comprising an optical system and a display component, wherein a normal image displayed by the display component is formed into a distorted image through the optical system, and the distorted image is a virtual image ∿102

Obtain sample object-side position coordinates and corresponding sample image-side field-of-view-angle coordinates for the display device, wherein the sample object-side position coordinates are used to represent display positions of sample pixels of the normal image in the display component, and the sample image-side field-of-view-angle coordinates are used to represent field of view angles of sample virtual image points in the distorted image corresponding to the sample pixels ╱104

Generate a correction function based on the sample object-side position coordinates and the sample image-side field-of-view-angle coordinates, the correction function being used to correct the distorted image ╱106

Fig. 1

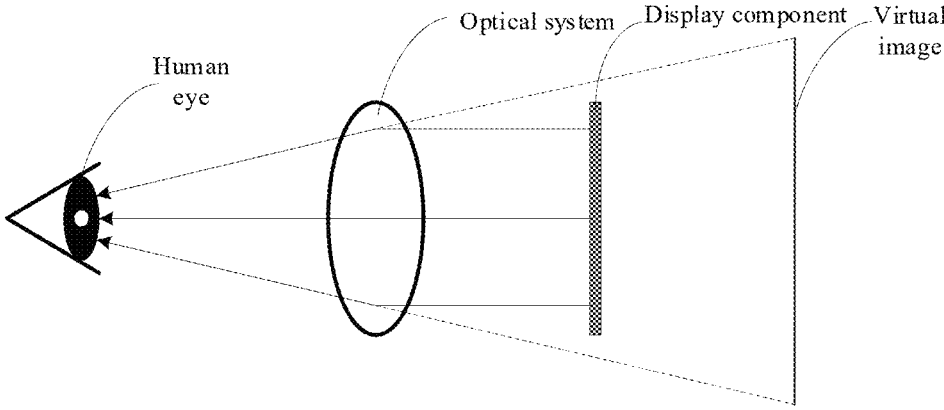

Human eye     Optical system     Display component     Virtual image

Fig. 2

Normal image                                    Distorted image

Virtual image

Human eye

Determine color values and corresponding image-side field-of-view-angle coordinates of pixels contained in a target image, the image-side field-of-view-angle coordinates being used to represent field of view angles of virtual image points corresponding to the pixels, the virtual image being formed through the optical system when the display component displays the target image ⟋∽ 502

Determine object-side position coordinates corresponding to the image-side field-of-view-angle coordinates based on a correction function, wherein the object-side position coordinates are used to represent expected display positions of the pixels in the display component, and the correction function is generated by the method for generating a correction function ⟋∽ 504

Control the display component to display the color values of the pixels at expected display positions ∽ 506

Fig. 5

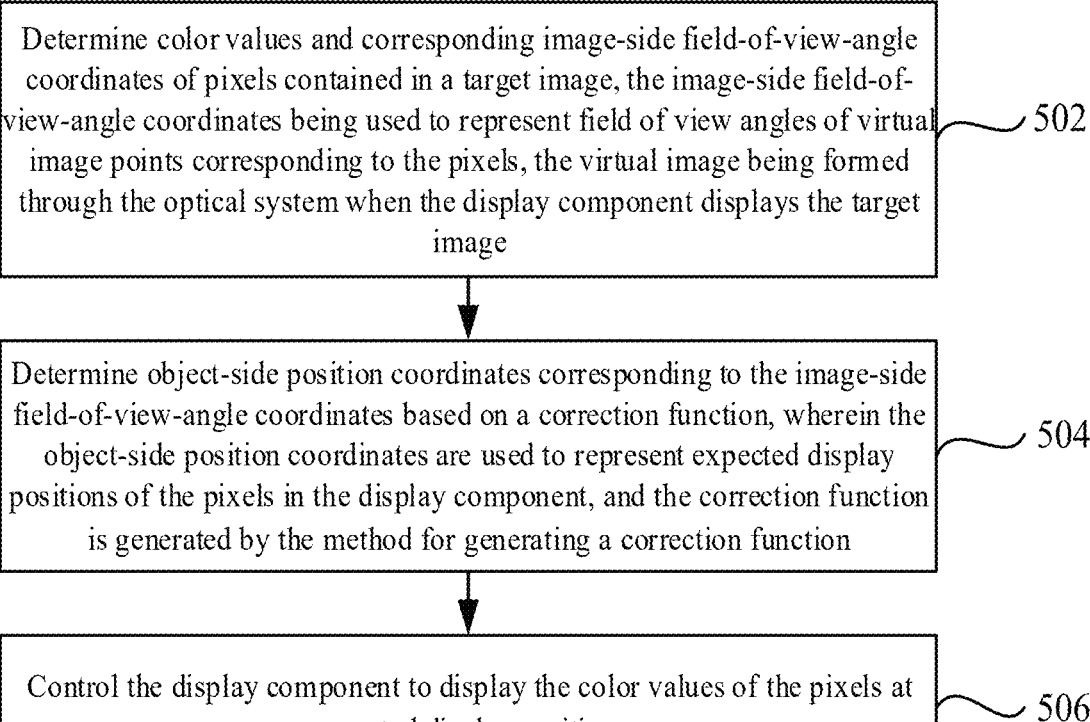

Fig. 6

Pre distorted image                    Corrected image (Normal image)

METHODS FOR GENERATING CORRECTION FUNCTION, IMAGE CORRECTION METHODS AND APPARATUSES

CROSS-REFERENCE TO RELATED APPLICATIONS

This application is a national stage of international PCT Application No. PCT/CN2022/114002 filed on Aug. 22, 2022, the entire contents of which are incorporated herein by reference.

TECHNICAL FIELD

The present disclosure relates to the field of image processing technology, and in particular to methods for generating a correction function, image correction methods and apparatuses.

BACKGROUND

At present, VR (Virtual Reality), AR (Augmented Reality), MR (Mixed Reality) and other XR (Extended Reality) technologies are developing rapidly. In the application of such technologies, it is usually necessary to use near eye display devices that include display components and optical systems to display images for users, in order to create corresponding visual effects.

Taking VR technology as an example, VR glasses worn by users usually include a screen and a lens. Lights emitted by the screen during an image display process can enter the user's eyes through the lens, and reverse extension lines of the lights form a corresponding virtual image. Due to the fact that the lens is usually a non-planar lens such as a convex or a concave lens, and it is difficult to ensure the lens per se to be strict parallel to the image plane, the virtual image tends to be distorted, such as radial distortion and/or tangential distortion, resulting in content distortion in the virtual image, affecting the user presence feeling, and even causing dizziness. To address this, it is necessary to perform distortion correction on the distorted image.

In related art, distortion correction is often implemented through predistortion. For example, a pre-distorted image is displayed on the screen and is formed into a normal image without distortion after passing through an optical system. For example, mathematical fitting is performed based on known device parameters from multiple dimensions, and sufficient data can be finally obtained to form the pre-distorted image. However, such fitting algorithms have complex logic, require a variety of input parameters, and the fitting process is cumbersome and inefficient. In addition, the fitting algorithms usually can only correct symmetric distortions and cannot effectively correct asymmetric distortions that may be caused by various reasons such as processing or assembly errors, and thus the applicability is limited.

SUMMARY

In view of the above, the present disclosed embodiment proposes a method for generating a correction function, an image correction method and apparatuses, to address the shortcomings in related art.

According to a first aspect of the embodiments of the present disclosure, there is provided a method for generating a correction function, including:

determining a display device including an optical system and a display component, wherein a normal image displayed by the display component forms a distorted image through the optical system, and the distorted image is a virtual image;

obtaining sample object-side position coordinates and corresponding sample image-side field-of-view-angle coordinates for the display device, wherein the sample object-side position coordinates are used to represent display positions of sample pixels of the normal image in the display component, and the sample image-side field-of-view-angle coordinates are used to represent field-of-view angles of sample virtual image points in the distorted image corresponding to the sample pixels;

generating a correction function based on the sample object-side position coordinates and the sample image-side field-of-view-angle coordinates, the correction function being used to correct the distorted image.

According to a second aspect of the embodiments of the present disclosure, there is provided an image correction method, applied to a display device including an optical system and a display component, the method including:

determining color values and corresponding image-side field-of-view-angle coordinates of pixels contained in a target image, the image-side field-of-view-angle coordinates being used to represent field-of-view angles of virtual image points corresponding to the pixels, the virtual image being formed through the optical system when the display component displays the target image;

determining object-side position coordinates corresponding to the image-side field-of-view-angle coordinates based on a correction function, wherein the object-side position coordinates are used to represent expected display positions of the pixels in the display component, and the correction function is generated by the method in the first aspect;

controlling the display component to display the color values of the pixels at expected display positions.

According to a third aspect of the embodiments of the present disclosure, there is provided an apparatus for generating a correction function, including one or more processors configured to:

determine a display device including an optical system and a display component, wherein a normal image displayed by the display component forms a distorted image through the optical system, and the distorted image is a virtual image;

obtain sample object-side position coordinates and corresponding sample image-side field-of-view-angle coordinates for the display device, wherein the sample object-side position coordinates are used to represent display positions of sample pixels of the normal image in the display component, and the sample image-side field-of-view-angle coordinates are used to represent field-of-view angles of sample virtual image points in the distorted image corresponding to the sample pixels;

generate a correction function based on the sample object-side position coordinates and the sample image-side field-of-view-angle coordinates, the correction function being used to correct the distorted image.

According to a fourth aspect of the embodiments of the present disclosure, there is provided an image correction apparatus, applied to a display device including an optical system and display components, the image correction apparatus including one or more processors configured to:

determine color values and corresponding image-side field-of-view-angle coordinates of pixels contained in a target image, the image-side field-of-view-angle coordinates being used to represent field-of-view angles of virtual image points corresponding to the pixels, the virtual image being formed through the optical system when the display component displays the target image; determine object-side position coordinates corresponding to the image-side field-of-view-angle coordinates based on a correction function, wherein the object-side position coordinates are used to represent expected display positions of the pixels in the display component, and the correction function is generated by the method in the first aspect;

control the display component to display the color values of the pixels at expected display positions.

According to a fifth aspect of the embodiments of the present disclosure, there is provided an electronic device including: a processor; a memory for storing processor executable instructions; wherein the processor is configured to implement the method for generating a correction function in the first aspect.

According to a sixth aspect of the embodiments of the present disclosure, there is provided a display device including: an optical system and a display component; a processor; a memory for storing processor executable instructions; wherein the processor is configured to implement the image correction method in the second aspect.

According to a seventh aspect of the embodiments of the present disclosure, there is provided a non-transitory computer-readable storage medium on which a computer program is stored, wherein when the program is executed by a processor, steps of the method for generating a correction function in the first aspect or steps of the image correction method in the second aspect are implemented.

According to the embodiments of the present disclosure, a correction function corresponding to the display component can be generated, which can be used to calculate the pre-distorted image that the display component should display, thereby achieving effective correction of the distorted image.

In the method for generating a correction function, sample object-side position coordinates and corresponding sample image-side field-of-view-angle coordinates of the display device containing the display component and the optical system can be obtained first. The object-side position coordinates are used to represent display positions of sample pixels of the normal image in the display component, the sample image-side field-of-view-angle coordinates are used to represent field of view angles of sample virtual image points in the distorted image corresponding to the sample pixels. Then, a correction function is generated based on the sample object-side position coordinates and the sample image-side field-of-view-angle coordinates.

Through this method, only the sample object-side position coordinates in the original image and the corresponding field-of-view angles of sample virtual image points in the distorted image need to be obtained, and the correction function of the display device can be calculated from these sample data. Compared to the fitting algorithms in related art, the required types of parameters are greatly reduced, and the corresponding function generation logic is also greatly simplified, which helps to improve the efficiency of generating correction functions.

In the image correction method, the display device can first determine color values and corresponding image-side field-of-view-angle coordinates of pixels contained in a target image. The image-side field-of-view-angle coordinates are used to represent field-of-view angles of virtual image points corresponding to the pixels. The virtual image is formed through the optical system when the display component displays the target image, then, based on the above correction function, determine object-side position coordinates corresponding to the image-side field-of-view-angle coordinates, wherein the object-side position coordinates are used to represent expected display positions of the pixels in the display component; finally, control the display component to display the color values of the pixels according to the expected display positions.

It can be understood that the expected display position of any pixel calculated by the above method is the display position of that pixel in the display component. After displaying each pixel at its corresponding expected display position, the display component displays the pre-distorted image corresponding to the target image—at this point, the pre-distorted image is formed into an undistorted virtual image through the optical system, thereby achieving distortion correction of the distorted image. In addition, since the position coordinates of the pixels of the target image in various directions of the optical axis can be calculated using the aforementioned method to obtain the corresponding field-of-view-angle coordinates, that is, the correction function has isotropy for the pixel position. Therefore, this method can not only correct symmetric distortion, but also correct asymmetric distortion, that is, it can correct images with distortion in any direction, with a wider range of applications.

It is to be understood that the above general descriptions and the below detailed descriptions are merely exemplary and explanatory, and are not intended to limit the present disclosure.

BRIEF DESCRIPTION OF DRAWINGS

In order to provide a clearer description of the technical solution in the embodiments of the present disclosure, a brief introduction will be made to the accompanying drawings required in the description of the embodiments. It is evident that the accompanying drawings are only some of the embodiments of the present disclosure. For those skilled in the art, other accompanying drawings can be obtained based on these drawings without creative effort.

FIG. 1 is a flowchart of a method for generating a correction function according to an embodiment of the present disclosure.

FIG. 2 is a schematic diagram of imaging process of a display device according to an embodiment of the present disclosure.

FIG. 5 is a flowchart of an image correction method illustrated according to an embodiment of the present disclosure.

FIG. 6 is a schematic diagram of a geometric relationship of a maximum field-of-view-angle according to an embodiment of the present disclosure.

DETAILED DESCRIPTION

Figure 3:
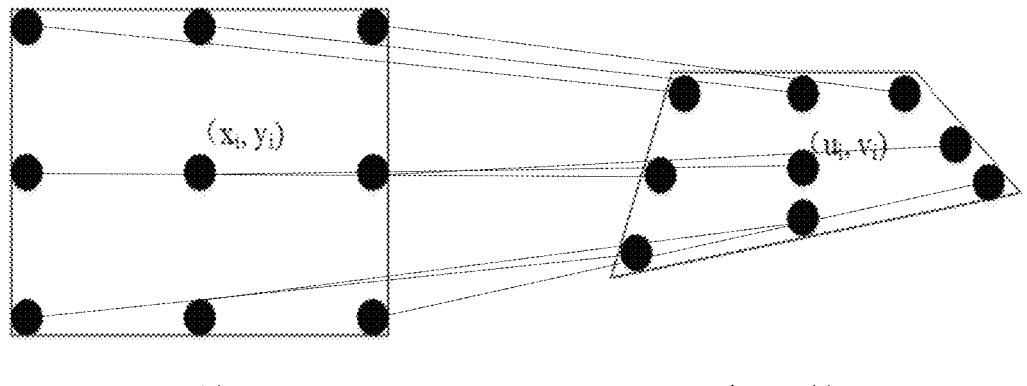
FIG. 3 is a schematic diagram of a distorted image illustrated according to an embodiment of the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, and not all of the embodiments. Based on the embodiments in the present disclosure, all other embodiments obtained by a person of ordinary skill in the art without making creative labour fall within the scope of protection of the present disclosure.

In an application process of XR technology, a near eye display device containing display components and optical systems is usually required to display an image to a user in order to create a corresponding visual effect. Taking VR technology as an example, the VR glasses worn by a user usually include a screen and a lens. Lights emitted by the screen during an image display process can enter the user's eyes through the lens, and reverse extension lines of the lights form a corresponding virtual image. Due to the fact that the lens is usually a non-planar lens such as a convex or a concave lens, and it is difficult to ensure the lens per se to be strict parallel to the image plane, the virtual image tends to be distorted, such as radial distortion and/or tangential distortion, resulting in content distortion in the virtual images, affecting the user presence feeling, and even causing dizziness. To address this, it is necessary to perform distortion correction on the distorted image.

In related art, distortion correction is often implemented through predistortion. For example, a pre-distorted image is displayed on the screen and is formed into a normal image without distortion after passing through an optical system. For example, mathematical fitting is performed based on known device parameters from multiple dimensions, and sufficient data can be finally obtained to form a pre-distorted image. However, such fitting algorithms have complex logic, require a variety of input parameters, and the fitting process is cumbersome and inefficient. In addition, the fitting algorithms usually can only correct symmetric distortions and cannot effectively correct asymmetric distortions that may be caused by various reasons such as processing or assembly errors, and thus the applicability is limited.

In this regard, an improved image correction solution is provided in the embodiments of the present disclosure. Specifically, a correction function applicable to the display device is generated, and the distorted image is corrected by the display device based on the correction function. A detailed description of the image correction solution will be provided in conjunction with the accompanying drawings in the following.

FIG. 1 is a flowchart of a method for generating a correction function according to an embodiment of the present disclosure. This method can be applied to any form of electronic devices, such as computers. Designers of display devices can use this method to generate correction functions for display devices in their own computers. Alternatively, this method can also be applied to a display device, for example, during a usage stage after design and production of the display device, the device can collect relevant data on its own and generate a correction function applicable to itself. As shown in FIG. 1, this method may include the following steps 102-106.

In Step 102, a display device including an optical system and a display component is determined, wherein a normal image displayed by the display component is formed into a distorted image through the optical system, and the distorted image is a virtual image.

The display device described in the embodiments of the present disclosure can be a near eye display device, which can be in the form of glasses, clothing, accessories, etc. Users can wear the display device in front of their eyes to observe the image displayed by the display device. Due to the inherent characteristics of the optical system, distortion of the virtual image is inevitable (in fact, distortion of the real image observed by the human eye can also occur). Therefore, when the display component displays a normal image, the virtual image corresponding to the normal image is a distorted image, which is the distorted image described in the embodiments of the present disclosure.

As shown in FIG. 2, the display component at a right side of the optical system emits corresponding lights during the image display process. The lights pass through the optical system and enter human eyes (i.e, the user's eyes) at a left side of the optical system. Based on the reversibility of light, the lights will form a virtual image of the image on the right side of the optical system. As shown in FIG. 3, when the normal image displayed by the display component is a rectangle, the corresponding distorted image may be an irregular quadrilateral. However, the shape of the distorted image shown in FIG. 3 is only illustrative, and in practical applications, the distorted image can be of any shape, which is not limited by the embodiment of the present disclosure.

It can be understood that there is a one-to-one correspondence between pixels contained in the normal image and the distorted image, that is, any sample pixel of the normal image (i.e., a pixel of the normal image) has a corresponding sample virtual image point in the distorted image (i.e., a pixel of the distorted image). As shown in FIG. 3, any sample pixel $(x_i, y_i)$ in a normal image has a corresponding sample virtual image point $(u_i, v_i)$ in a distorted image, where $1 \leq i \leq n$, n is a total number of pixels of the normal image (or distorted image).

In Step 104, sample object-side position coordinates and corresponding sample image-side field-of-view-angle coordinates for the display device are obtained, wherein the sample object-side position coordinates are used to represent display positions of sample pixels of the normal image in the display component, and the sample image-side field-of-view-angle coordinates are used to represent field-of-view angles of sample virtual image points in the distorted image corresponding to the sample pixels.

In the embodiments of the present disclosure, a correction function for the display device is creatively generated based on the position coordinates of the sample pixels of the normal image (i.e., the sample object-side position coordinates) and the field-of-view angles of the sample virtual image points in the distorted image (i.e., the sample image-side field-of-view-angle coordinates), in order to significantly reduce the number of parameters required to generate the correction function and simplify the generation logic of the correction function. Therefore, before generating the correction function, it is necessary to first obtain sample data, that is, to obtain the sample object-side position coordinates and the sample image-side field-of-view-angle coordinates.

Considering that the normal image is displayed by the display component, the position coordinates of the sample pixels in the display component (used to represent the display positions of the pixels in the display component) can be used as the sample object-side position coordinates. Specifically, the position coordinates of any sample pixel can be horizontal and vertical components of the relative position of the pixel. As shown in FIG. 3, a Cartesian coordinate system can be established with a lower left corner vertex of the normal image as the origin, and the coordinates of the sample pixels in the Cartesian coordinate system can be used as the sample object-side position coordinates. However, the Cartesian coordinate system can be established in various other ways, and the embodiments of the present disclosure do not limit this.

Figure 4:
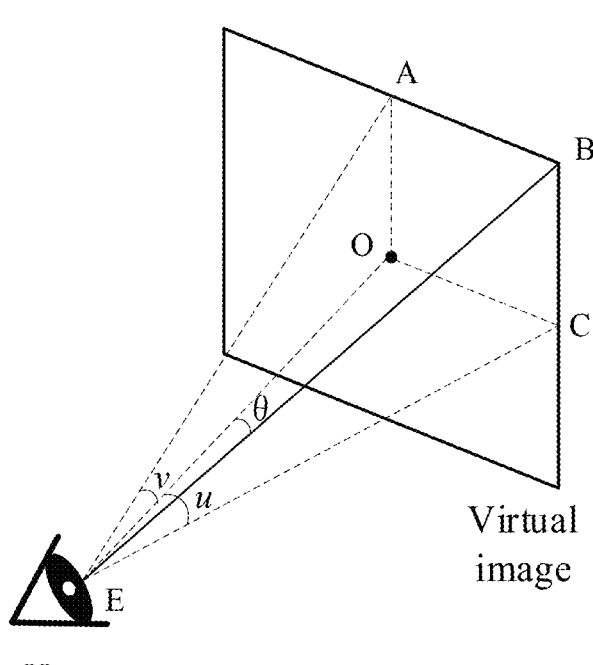
FIG. 4 is a schematic diagram of a field-of-view-angle of a pixel according to an embodiment of the present disclosure.

In fact, each pixel of the normal image and the distorted image respectively has corresponding field-of-view angles, where a field-of-view-angle of any one pixel of any one image is an angle between a line connecting the pixel and a human eye and a line connecting a pixel on an optical axis of the image and the human eye. It should be noted that the embodiments of the present disclosure only focus on the field-of-view angles of the sample virtual image points in distorted images. As shown in FIG. 4, for any virtual image, assuming a contour of the virtual image is a rectangle, the optical axis passes through a center point O of the rectangle, and the field-of-view-angle of any vertex B in the virtual image is θ (i.e. ∠ OEB). At this point, the field-of-view-angle θ can be split along a horizontal direction and a vertical direction into two angles u (i.e. ∠ OEC) and v (i.e. ∠ OEA). It can be understood that for any two pixels of the virtual image, their field-of-view angles may be different; and the angles u and v obtained after splitting the two field-of-view angles cannot be both identical, so an array composed of the split angles u and v can be used to represent θ. Based on this, the array formed by the two angles obtained after splitting the field-of-view-angle can be used as the sample image-side field-of-view-angle coordinates. As shown in FIG. 4, the sample image-side field-of-view-angle coordinates corresponding to point B can be the field-of-view-angle θ, or can also be (u, v), and this applies similarly to other pixels, which will not be elaborated. It can be seen that the sample image-side field-of-view-angle coordinates corresponding to any virtual image point are components of the field-of-view-angle of the virtual image point in the horizontal and vertical directions. Based on this, for each sample pixel of the normal image, the sample image-side field-of-view-angle coordinates corresponding to the respective virtual image point can be determined respectively.

Specifically, various other methods can be used to obtain the sample object-side position coordinates and sample image-side field-of-view-angle coordinates for the display device. As an exemplary embodiment, considering that the distortion is mainly caused by the inherent structure of the optical system, it is possible to retrieve by query the optical parameters of the optical system and determine the display positions of sample pixels of the normal image and the field-of-view angles of the sample virtual image points corresponding to the sample pixels based on the optical parameters. Here, the optical parameters may include focal length, optical power, magnification, and/or optical aperture of the optical system, which are not limited by the embodiments of the present disclosure. Normally, designers will inspect the display components and optical system during the design stage of the display device, and calculate benchmark data for the optical system based on the inspection results and corresponding optical parameters. The benchmark data includes the position coordinates of the displayed pixels in the display component and field-of-view angles of the corresponding virtual image points in the virtual image for trial production. Therefore, the benchmark data can also be directly retrieved by query from the design description of the display device, and at this time, the sample object-side position coordinates and the sample image-side field-of-view-angle coordinates can be determined without calculation.

In another exemplary embodiment, the distorted image can also be captured by a camera, wherein the camera can be a calibrated standard camera with preset parameters. Furthermore, the field-of-view angles of the sample virtual image points in the distorted image can be calculated using the preset parameters of the camera; determine the sample pixels corresponding to the sample virtual image points in the normal image, and calculate the display positions of the sample pixels using the preset parameters of the display component.

In one embodiment, in order to ensure that the generated correction function has high accuracy, it is possible to obtain as much sample data as possible across a wide distribution range. Taking the sample virtual image points as example, when obtaining the sample image-side field-of-view-angle coordinates in the previous step, the number of corresponding sample virtual image points can be multiple, and a field-of-view-angle range composed of the field-of-view angles of the multiple sample virtual image points may be no less than a preset range threshold. Specifically, before obtaining the sample data, the field-of-view-angle range of the sample virtual image points corresponding to the sample data or the position range of the sample pixels can be determined first. As shown in FIG. 3, the position range can be first determined in a normal image, which should include as many pixels as possible in the normal image. Furthermore, sample pixels and the respective sample object-side position coordinates thereof can be sequentially determined within this position range. Then the virtual image points of the distorted image corresponding to the sample pixels and their respective sample image-side field-of-view-angle coordinates are determined. Alternatively, the field-of-view-angle range can be determined first in the distorted image, wherein the field-of-view-angle range should include as many pixels as possible in the distorted image, and the field-of-view-angle range should not be less than the preset range threshold.

Through the above method, the sample object-side position coordinates of multiple sample pixels of a normal image, and the sample image-side field-of-view-angle coordinates of each sample pixel corresponding to the sample virtual image points in the distorted image, can be obtained. In other words, sample data can be obtained from multiple pairs of sample pixels and sample virtual image points.

In Step 106, a correction function is generated based on the sample object-side position coordinates and the sample image-side field-of-view-angle coordinates, the correction function being used to correct the distorted image.

After obtaining the sample object-side position coordinates and the sample image-side field-of-view-angle coordinates, a correction function can be generated based on these sample data. Here, the correction function described in the embodiments of the present disclosure can be in various forms such as polynomial function or trigonometric function, and the embodiments of the present disclosure do not limit this.

The inventor found that the sample object-side position coordinates of the sample pixels and the sample image-side field-of-view-angle coordinates of the sample virtual image points can be represented in a binary form. Moreover, when the sample object-side position coordinates are used as a function of the sample image-side field-of-view-angle coordinates, the relationship between the two conforms to the form of a bivariate polynomial surface. In view of this, in one embodiment, the object-image relationship between sample pixels (equivalent to the object) and sample virtual image points (equivalent to the image) can be represented by a bivariate polynomial surface function relationship, that is, the correction function can be in the form of a bivariate polynomial function. For example, the sample object-side position coordinates of the sample pixels and the corresponding sample image-side field-of-view-angle coordinates of the sample virtual image points can be substituted into a binary polynomial to generate a binary polynomial equation containing polynomial coefficients. Then the binary polynomial equation is solved to determine values of the polynomial coefficients, and the values are substituted back into the binary polynomial to obtain the correction function.

For example, assuming that the sample object-side position coordinates of a sample pixel with a label i are denoted as $(x_i, v_i)$ and the sample image-side field-of-view-angle coordinates corresponding to the sample pixel are denoted as $(u_i, v_i)$, the binary polynomial expression between the two can be seen in equation (1):

$$\begin{cases} x = \sum_{m=1,n=1}^{p,q} a_{mn} u^{m-1} v^{n-1} \\ y = \sum_{m=1,n=1}^{p,q} b_{mn} u^{m-1} v^{n-1} \end{cases} \quad (1)$$

where $a_{mn}$ and $b_{mn}$ are polynomial coefficients, and p and q are the highest powers of variables (i.e. u and v) plus 1. To ensure the fitting accuracy of the correction function is as high as possible, it is possible to set $p \geq 6$ and $q \geq 6$.

In practical applications, the expansion formula of equation (1) can be used for calculation, as shown in equation (2):

$$(2)$$

$$\begin{cases} x = \left(a_{11}u^0v^0 + a_{12}u^0v^1 + \cdots a_{1q}u^0v^q\right) + \left(a_{21}u^1v^0 + a_{22}u^1v^1 + \cdots a_{2q}u^1v^q\right) \\ + \cdots + \left(a_{p1}u^{p-1}v^0 + a_{p2}u^{p-1}v^1 + \cdots a_{pq}u^{p-1}v^q\right) \\ y = \left(b_{11}u^0v^0 + b_{12}u^0v^1 + \cdots b_{1q}u^0v^q\right) + \left(b_{21}u^1v^0 + b_{22}u^1v^1 + \cdots b_{2q}u^1v^q\right) \\ + \cdots + \left(b_{p1}u^{p-1}v^0 + b_{p2}u^{p-1}v^1 + \cdots b_{pq}u^{p-1}v^q\right) \end{cases}$$

It can be assumed that in the previous steps, the sample object-side position coordinates of N sample pixels of a normal image, and the sample image-side field-of-view-angle coordinates of N sample virtual points in a distorted image (where the N sample pixels and the N sample virtual points correspond one-to-one) have been obtained. Based on this, the sample data of N pairs $(x_i, y_i)$ and $(u_i, v_i)$ can be sequentially substituted into the expansion formula (2). Because the substituted u and v are both real numbers, so the unknowns (i.e, polynomial coefficients) can be obtained as $a_{11}$, $a_{12} \ldots a_{pq}$ and $b_{11}$, $b_{12} \ldots b_{pq}$ polynomial equations. Apparently, by solving the polynomial equation, the values of the polynomial coefficients can be obtained. Afterwards, the values are substituted back into equation (2) to obtain the correction function with unknown u and v.

At this point, the correction function is obtained. Because the sample data used in the generation process of this function is collected from the display device, the correction function can be used to correct distortions in the display device.

According to the embodiments, in the method for generating a correction function, the sample object-side position coordinates and corresponding sample image-side field-of-view-angle coordinates of the display device including the display component and the optical system can be obtained first. The sample object-side position coordinates are used to represent display positions of the sample pixels of a normal image in the display component, the sample image-side field-of-view-angle coordinates are used to represent field-of-view angles of the sample virtual image points corresponding to the sample pixels of the distorted image. Then, a correction function is generated based on the sample object-side position coordinates and the sample image-side field-of-view-angle coordinates.

Through this method, it is only necessary to obtain the position coordinates of sample pixels of the original image and the corresponding field-of-view angles of sample virtual points in the distorted image, and a correction function of the display device can be calculated from the sample data. Compared to the fitting algorithms in related art, the required types of parameters are greatly reduced, and the corresponding function generation logic is also greatly simplified, which helps to improve the efficiency of generating correction functions.

A process of correct the abnormalities of the display device using the correction function will be described in conjunction with examples in the following. FIG. 5 is a flowchart of an image correction method according to an embodiment of the present disclosure. This method can be applied to a display device including an optical system and a display component. As shown in FIG. 5, the method may include the following steps 502-506.

In Step 502, color values and corresponding image-side field-of-view-angle coordinates of pixels contained in a target image are determined, the image-side field-of-view-angle coordinates being used to represent field-of-view angles of virtual image points corresponding to the pixels, the virtual image being formed through the optical system when the display component displays the target image.

In the embodiments of the present disclosure, the display device may pre store the correction function generated in the above embodiments. Alternatively, the display device can also collect sample data to temporarily generate a correction function during use. It can be understood that if the display component in the display device directly displays the target image, the image will produce a distorted virtual image after passing through the optical system. Therefore, the distortion correction function can be used to correct the distorted image. The process of distortion correction is to generate a pre-distorted image based on the correction function and the image-side field-of-view-angle data, and control the display component to display the image.

Before performing distortion correction, it is necessary to first determine the color values of the pixels contained in the target image and the corresponding image-side field-of-view-angle data of the pixels. The color values of the pixels of the target image can be represented using any color model such as RGB model, RGBa model, CMYK model, YUV model, etc., the embodiments of the present disclosure do not limit this.

It can be understood that the image-side field-of-view-angle data corresponding to any pixel is used to represent the field-of-view-angle of the virtual image point corresponding to that pixel, the virtual image point is a virtual image point corresponding to the pixel of the normal image displayed after distortion correction is completed. It can be seen that the field-of-view-angle of the virtual image point is actually an expected theoretical value. Based on the principle of reversibility of light, the field-of-view-angle can be determined.

From the generation process of the correction function, it can be seen that the correction function is targeted to the optical system and display component in the display device, that is, the correction function generated based on sample data of a set of optical systems and display components can usually only be directly applied to that set of optical systems and display components, if the parameters of the optical system or display component change, the original correction function is difficult to directly apply to the changed optical system and display component. However, if the correction function is generated during the design stage of the display device, the optical system or display component may be temporarily replaced during the production stage for various reasons, resulting in actual parameters of the combination of the optical system and display component in the completed display device being different from the optical parameters determined during the design stage. At this point, if the correction function generated during the design stage is directly applied to the display device, it will result in a large calculation error with the correction function, and even fail to calculate meaningful results, leading to poor distortion correction effect.

In this regard, an embodiment of the present disclosure provides a range adaptation solution to address the problem. In general, if the optical system and/or display component in the display device are replaced (or some variable parameters are modified), the display range of the display component in the current display device may not be the same as the imaging range of the optical system. To determine whether the display range is the same as the imaging range, it is first necessary to determine whether the display range is consistent with the imaging range. Here, the display range and imaging range can be represented by parameters such as size or maximum field-of-view-angle.

Here, the imaging range of the optical system can be calculated by optical parameters such as focal length, optical power, magnification, and/or optical aperture of the optical system, which are usually recorded in the local storage space of the display device. Therefore, the display device can read the optical parameters of the display component locally to determine the imaging range thereof. The specific process of calculating the size of the imaging range or its corresponding maximum field-of-view-angle based on the optical parameters can be found in the relevant art, which will not be repeated herein.

The display range of the display component can be determined by the imaging range of the optical system. For example, the display component can first determine an optical origin of the optical system and a display origin of the display component, wherein the optical origin, the display origin, and an observation point of the optical device are all located on the optical axis of the display device. Then, a first maximum field-of-view-angle of a first edge point farthest from the optical origin in the optical system and a first maximum distance between the first edge point and the optical origin can be determined. Then, a second maximum distance between a second edge point in the display component that is farthest from the display origin and the display origin is determined. Finally, based on a geometric relationship between the optical system and the display component, a second maximum field-of-view-angle of the second edge point is calculated from the first maximum field-of-view-angle, the first maximum distance, and the second maximum distance. The second maximum field-of-view-angle can be used to represent the display range of the display component.

As shown in FIG. 6, the display device includes a screen and an optical system (not shown in the figure), the display range of the screen is smaller than the imaging range of the optical system, and the virtual image shown in FIG. 6 is the same size as the imaging range of the optical system. Here, the display component can first determine the optical origin O of the optical system and the display origin O' of the screen, where the optical origin O, the display origin O', and the observation point E of the optical device are all located on the optical axis of the display device (i.e, the straight line where the line segment EO is located). The optical origin O, display origin O', and observation point E of the optical device shown in FIG. 6 are located on the same straight line. It can be understood that the spatial position relationship is only exemplary. In practical applications, the display component, the optical system, and the observation point can also be located on different straight lines. For example, the optical system can be an eccentric optical system, etc. This is not limited by the embodiments of the present disclosure.

Furthermore, the display device can determine the first maximum field-of-view-angle $\theta_1$ (i.e. $\angle$ BEO) of the first edge point B farthest from the optical origin O in the optical system and the first maximum distance $r_1$ between the first edge point B and the optical origin O (i.e, the length of the line segment OB); and determine the second maximum distance $r_2$ between the second edge point B' farthest from the display origin O' on the screen and the display origin (i.e, the length of the line segment O'B'); and finally, calculate the second maximum field-of-view-angle $\theta_2$ of the second edge point based on the geometric relationship between the optical system and the screen, using the first maximum field-of-view-angle $\theta_1$, the first maximum distance $r_1$ and the second maximum distance $r_2$. The calculation formula can be found in equation (3):

$$\theta_2 = \arctan\frac{r_2 \tan\theta_1}{r_1} \tag{3}$$

At this point, the calculated second maximum field-of-view-angle $\theta_2$ can be used to represent the display range of the screen. Here, when the optical system is an eccentric system, the geometric relationship between the parameters will be different, and the calculation formula for the second maximum field-of-view-angle $\theta_2$ can be modified according to the actual geometric relationship, which will not be elaborated herein.

After determining the display range of the display component and the imaging range of the optical system through the above method, the display device can further determine whether the two are the same. When the display range is different from the imaging range, the scaling ratio between the display range and the imaging range can be determined. Then, based on the scaling ratio, the virtual image points corresponding to the pixels contained in the target image within the imaging range are determined, and the field-of-view angles of the virtual image points is used as the image-side field-of-view-angle coordinates corresponding to the pixels. As shown in FIG. 6, the maximum field-of-view-angle can be used to verify the display range and imaging range, and the scaling ratio between the two is $\theta_1/\theta_2$. Taking any pixel P' with a field-of-view-angle $\theta_x$ on the screen as an example, the field of view of the virtual image point P corresponding to that pixel is $\theta_x*\theta_1/\theta_2$. Based on this, the corresponding image-side field-of-view-angle data for any pixel can be calculated.

In another embodiment, the display device may determine the color values and the image-side field-of-view-angle coordinates of each of all pixels contained in the target image. Based on this, the display device can use the correction function to sequentially calculate the object-side position coordinates corresponding to each pixel, that is, determine the expected display position of each pixel in the display device, thereby determining the color and display position of each pixel in the pre-distorted image.

It can be understood that the process of substituting the image-side field-of-view-angle coordinates into the correction function to calculate the corresponding object-side position coordinates requires consumption of computing resources by the display device. In order to reduce the workload of calculating the object-side position coordinates and reduce the corresponding resource consumption, the display device can also first determine the key pixels of all of the pixels contained in the target image, then, determine the color values and image-side field-of-view-angle coordinates of each key pixel. Afterwards, the correction function can be used to calculate the object-side position coordinates corresponding to each key pixel. Through this method, only the image-side field-of-view-angle coordinates of key pixels of the target image (i.e, some pixels of all pixels) need to be substituted into the correction function to calculate the corresponding object-side position coordinates, while for the remaining non-key pixels, the above processing is not needed, thereby reducing the workload for calculating the correction function, reducing the computational resource consumption of display devices, and also improving processing speed and avoiding display lag.

Here, the display device can determine key pixels of the target image in various ways. For example, multiple key pixels can be randomly selected in the target image, which has a simple selection logic. For example, multiple key pixels can also be selected sequentially in the target image at a preset field-of-view-angle interval. Here, the field-of-view-angle range where the key pixels are located can be [0, $\theta_{max}$], where $\theta_{max}$ is the maximum field-of-view-angle of the target image, which can be an angle between a line connecting a pixel disposed at the edge of the image and farthest from the optical axis in the target image and the human eye, and the optical axis. In this regard, the display device can sequentially determine the pixels corresponding to field-of-view angles within the range of the field-of-view-angle in steps of 2° (or 1°, 10°, etc.) (i.e, the preset field-of-view-angle interval), and determine these pixels as the key pixels. For example, multiple key pixels can be selected sequentially in the target image at a preset distance interval. Here, the range of key pixels can be a rectangle that is not larger than the size of the target image per se. Based on this, the display device can sequentially determine pixels within the range at a step of 5 (or 2, 10, etc.) pixels, and use them as key pixels of the target image. Through the above methods, it is possible to ensure that the determined key pixels are distributed as widely and evenly as possible in the target image, thereby improving the uniformity of the correction effect.

In Step 504, object-side position coordinates corresponding to the image-side field-of-view-angle coordinates are determined based on the correction function, wherein the object-side position coordinates are used to represent expected display positions of the pixels in the display component, and the correction function is generated by the method for generating a correction function mentioned above.

After determining the image-side field-of-view-angle coordinates of the pixels of the target image through the above embodiments, the display device can use the correction function generated by the above solution to calculate the corresponding object-side position coordinates.

Figure 7:
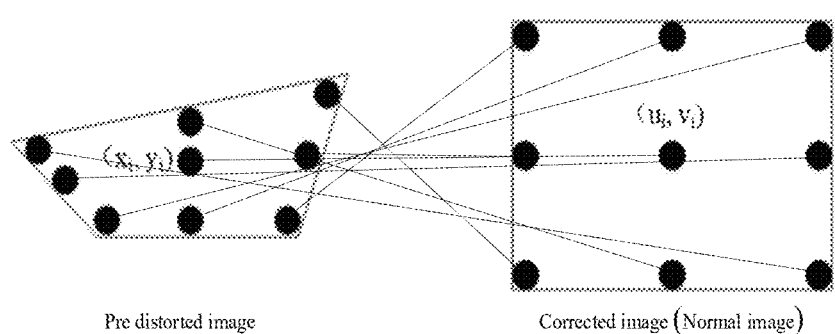
FIG. 7 is a schematic diagram of a pre-distorted image according to an embodiment of the present disclosure.

Continuing from the example of determining the image-side field-of-view-angle coordinates of key pixels, pixels of the target image other than the key pixels are non-key pixels. In other words, pixels of the target image can be divided into two categories: the key pixels and non-key pixels. As mentioned earlier, the display device has determined the image-side field-of-view-angle coordinates of each key pixel, so at this point, the object-side position coordinates corresponding to the image-side field-of-view-angle coordinates of the key pixels can be determined based on the correction function. Furthermore, an interpolation algorithm can be used to determine the image-side field-of-view-angle coordinates and their corresponding object-side position coordinates for each non-key pixel. Through this method, the display device only needs to calculate the object-side position coordinates corresponding to some pixels (i.e, key pixels) in the target image using the correction function, while the object-side position coordinates corresponding to other non-key pixels can be directly calculated through interpolation algorithms, thereby reducing the workload of calculating the correction function and simplifying the logic of determining object-side position coordinates. Alternatively, in order to further save computational resources on display devices, an interpolation algorithm can be used to determine the color values of non-key pixels based on the color values of the key pixels. As shown in FIG. 7, the black dots in the pre-distorted image correspond to key pixels of the target image, while the blank area between the black dots corresponds to non-key pixels of the target image.

In one embodiment, there may be multiple ways to determine the object-side position coordinates corresponding to the image-side field-of-view-angle coordinates using the correction function. For example, the display device can directly substitute the image-side field-of-view-angle coordinates into the correction function, and determine the corresponding object-side position coordinates by solving the function. Taking the generation of the correction function based on the above equation (2) as an example, it can be understood that the coefficients of the polynomials in the correction function (i.e. $a_{11}, a_{12} \ldots a_{pq}$ and $b_{11}, b_{12} \ldots b_{pq}$) are constant, and the variables are only u and v. Therefore, after substituting the image-side field-of-view-angle coordinates of each pixel (i.e, the specific values of u and v of each pixel) into the function, the corresponding x and y can be directly solved to obtain the object-side position coordinates (x, y).

Alternatively, in order to improve the speed of determining object-side position coordinates, the display device can also pre calculate the corresponding object-side position coordinates based on the correction function and the preset image-side field-of-view-angle data when idle, and compile the predetermined image-side field-of-view-angle coordinates and corresponding object-side position coordinates into an object-image mapping table. Thus, after determining the image-side field-of-view-angle coordinates through the above method, the object-side position coordinates corresponding to the image-side field-of-view-angle coordinates can be directly retrieved by query from the object-image mapping table, thereby further improving the speed of determining object-side position coordinates and greatly accelerating the speed of distortion correction. However, for pixels where corresponding data cannot be found in the table, the correction function can still be used for temporary calculation, and this is not limited by the embodiments of the present disclosure. It can be understood that the more data recorded in the object-image mapping table, the better the performance of the query. However, the storage space occupied by the mapping table will also be larger, and the query time may be longer. Therefore, the amount of data recorded in the object-image mapping table can be reasonably set according to the actual situation, in order to achieve a balance between storage space and query efficiency. For example, it is possible to record only the data corresponding to each key pixel, without the need to record the data corresponding to all the pixels, which will not be elaborated herein.

In Step 506, the display component is controlled to display the color values of the pixels at expected display positions.

As mentioned earlier, the object-side position coordinates corresponding to any pixel of the target image can be used to represent the expected display position of that pixel in the display component. From the generation process of the correction function mentioned above, it can be seen that if each pixel of the target image is displayed at its corresponding expected display position, the display component can display a pre-distorted image. At this time, a corresponding, distortion-free corrected image can be formed through the optical system. Therefore, the display device can control the display component to display the color values of each pixel of the target image according to the expected display position represented by the object-side position coordinates, given the color values of each pixel of the target image and its object-side position coordinates, thereby displaying the pre-distorted image and achieving distortion correction of the distorted image.

As shown in FIG. 7, when an irregular quadrilateral pre-distorted image is displayed in the display component, the image forms a rectangular corrected image through the optical system, which is a normal image without distortion.

Through the above embodiments, the display device can first determine the color values and corresponding image-side field-of-view-angle coordinates of the pixels contained in the target image. The image-side field-of-view-angle coordinates are used to represent the field-of-view angles of the virtual image points corresponding to the pixels, which is formed through the optical system when the display component displays the target image. Then, based on the above correction function, the display device can determine the object-side position coordinates corresponding to the image-side field-of-view-angle coordinates, which are used to represent the expected display positions of the pixels in the display component. Finally, the display device can control the display component to display the color values of the pixels according to the expected display positions.

It can be understood that the expected display position of any pixel calculated by the above method is the display position of that pixel in the display component. After displaying each pixel at its corresponding expected display position, the display component displays the pre-distorted image corresponding to the target image—at this point, an undistorted virtual image can be formed through the optical system, thereby achieving distortion correction of the distorted image. In addition, since the position coordinates of the pixels of the target image in various directions of the optical axis can be calculated using the aforementioned method to obtain the corresponding field-of-view-angle coordinates, that is, the correction function has isotropy for the pixel position. Therefore, this method can not only correct symmetric distortion, but also correct asymmetric distortion, that is, it can correct images with distortion in any direction, with a wider range of applications.

Corresponding to the embodiment of the method for generating a correction function mentioned above, the present disclosure also provides an embodiment of an apparatus for generating a correction function.

An embodiment of the present disclosure provides an apparatus for generating a correction function, the apparatus including one or more processors configured to:

determine a display device including an optical system and a display component, wherein a normal image displayed by the display component forms a distorted image through the optical system, and the distorted image is a virtual image;

obtain sample object-side position coordinates and corresponding sample image-side field-of-view-angle coordinates for the display device, wherein the sample object-side position coordinates are used to represent display positions of sample pixels of the normal image in the display component, and the sample image-side field-of-view-angle coordinates are used to represent field-of-view angles of sample virtual image points in the distorted image corresponding to the sample pixels;

generate a correction function based on the sample object-side position coordinates and the sample image-side field-of-view-angle coordinates, the correction function being used to correct the distorted image.

In an example, the one or more processors are further configured to:

retrieve by query optical parameters of the optical system and determine the display positions of sample pixels of the normal image and the field-of-view angles of the sample virtual image points corresponding to the sample pixels based on the optical parameters; or capture the distorted image by a camera, calculate the field-of-view angles of the sample virtual image points in the distorted image using preset parameters of the camera; and determine the sample pixels corresponding to the sample virtual image points in the normal image, and calculate the display positions of the sample pixels using preset parameters of the display component.

In an example, a number of the sample virtual image points is multiple, and a field-of-view-angle range composed of the field-of-view angles of the multiple sample virtual image points is no less than a preset range threshold.

In an example, the one or more processors are further configured to:

substitute the sample object-side position coordinates of the sample pixels and the corresponding sample image-side field-of-view-angle coordinates of the sample virtual image points into a binary polynomial to generate a binary polynomial equation containing polynomial coefficients;

solve the binary polynomial equation to determine values of the polynomial coefficients, and substitute the values back into the binary polynomial to obtain the correction function.

Corresponding to the embodiment of the image correction method mentioned above, the present disclosure also provides an embodiment of an image correction apparatus.

An embodiment of the present disclosure provides an image correction apparatus, applied to a display device including an optical system and a display component, the apparatus including one or more processors configured to:

determine color values and corresponding image-side field-of-view-angle coordinates of pixels contained in a target image, the image-side field-of-view-angle coordinates being used to represent field-of-view angles of virtual image points corresponding to the pixels, the virtual image being formed through the optical system when the display component displays the target image;

determine object-side position coordinates corresponding to the image-side field-of-view-angle coordinates based on a correction function, where the object-side position coordinates are used to represent expected display positions of the pixels in the display component, and the correction function is generated by the method for generating a correction function mentioned above;

control the display component to display the color values of the pixels at expected display positions.

In an example, the one or more processors are further configured to:

when a display range of the display component is different from an imaging range of the optical system, determine a scaling ratio between the display range and the imaging range;

determine virtual image points corresponding to the pixels contained in the target image within the imaging range based on the scaling ratio, and the field-of-view angles of the virtual image points being used as the image-side field-of-view-angle coordinates corresponding to the pixels.

In an example, the one or more processors are further configured to:

determine an optical origin of the optical system and a display origin of the display component, wherein the optical origin, the display origin, and an observation point of the optical device are all located on an optical axis of the display device;

determine a first maximum field-of-view-angle of a first edge point farthest from the optical origin in the optical system and a first maximum distance between the first edge point and the optical origin, determine a second maximum distance between a second edge point in the display component that is farthest from the display origin and the display origin;

calculate a second maximum field-of-view-angle of the second edge point based on a geometric relationship between the optical system and the display component, according to the first maximum field-of-view-angle, the first maximum distance, and the second maximum distance, where the second maximum field-of-view-angle is used to represent the display range of the display component.

In an example, the one or more processors are further configured to:

determine the color values and the image-side field-of-view-angle coordinates of each of all pixels contained in the target image; or determine key pixels of all of the pixels contained in the target image, and determine the color values and image-side field-of-view-angle coordinates of each of the key pixels.

In an example, the one or more processors are further configured to:

randomly select a plurality of key pixels in the target image, or select a plurality of key pixels sequentially in the target image at a preset field-of-view-angle interval or at a preset distance interval.

In an example, all of the pixels in the target image includes non-key pixels and key pixels, the one or more processors are further configured to:
determine object-side position coordinates corresponding to image-side field-of-view-angle coordinates of the key pixels based on a correction function; and determine image-side field-of-view-angle coordinates and corresponding object-side position coordinates of the non-key pixels using an interpolation algorithm; or the one or more processors are further configured to:
determine color values of non-key pixels based on color values of the key pixels using an interpolation algorithm.

The one or more processors are further configured to:

substitute the image-side field-of-view-angle coordinates into the correction function, and determine corresponding object-side position coordinates by solving the correction function; or retrieve by query object-side position coordinates corresponding to the image-side field-of-view-angle coordinates from an object-image mapping table, the object-image mapping table being obtained by calculation according to the correction function and preset image-side field-of-view-angle data.

Regarding the apparatuses in the above embodiments, the specific ways in which each module performs operations have been described in detail in the relevant method embodiments, which will not be elaborated herein.

An embodiment of the present disclosure further provides an electronic device including: a processor; a memory for storing processor executable instructions; wherein the processor is configured to implement the method for generating a correction function described in any of the above embodiments.

An embodiment of the present disclosure further provides an electronic device including an optical system and a display component; a processor; a memory for storing processor executable instructions; wherein the processor is configured to implement the image correction method described in any of the above embodiments.

An embodiment of the present disclosure further provides a non-transitory computer-readable storage medium on which a computer program is stored, when the program is executed by a processor, steps of the method for generating a correction function or of the image correction method described in any of the above embodiments are implemented.

Figure 8:
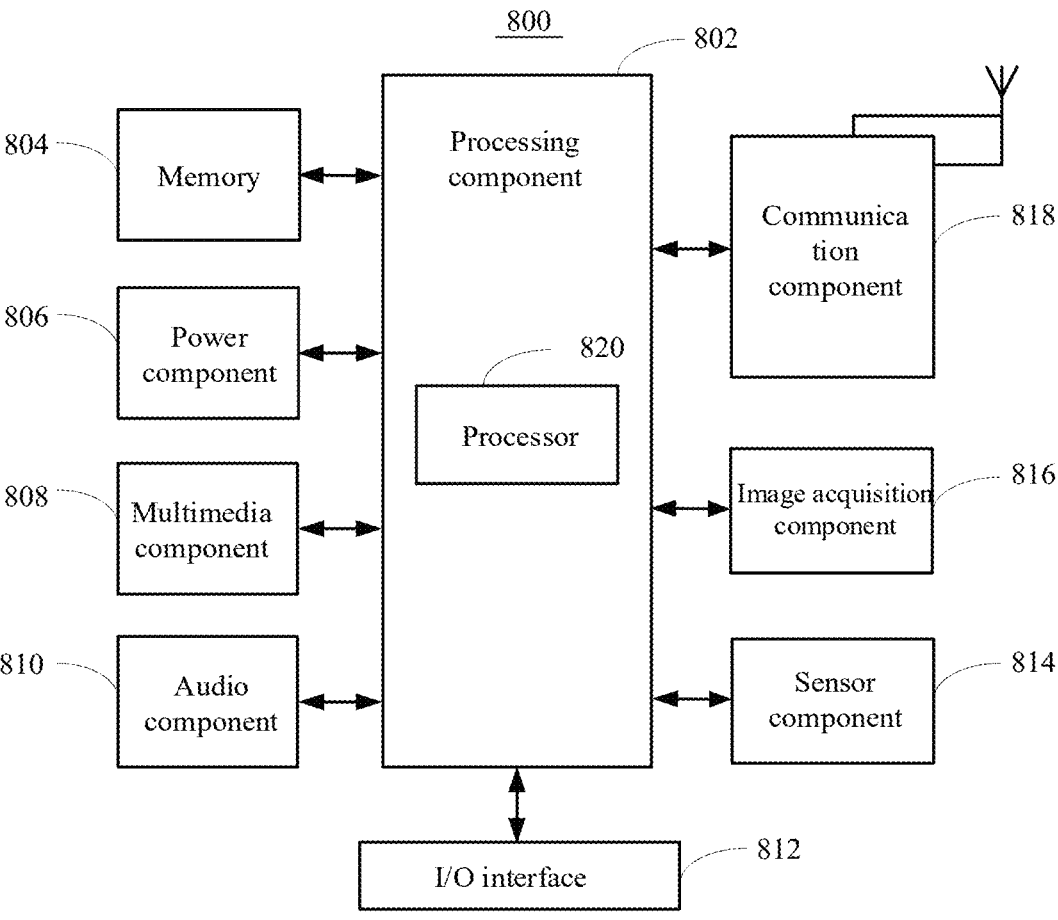
FIG. 8 is a schematic block diagram of an apparatus for generating a correction function according to an embodiment of the present disclosure.

FIG. 8 s a schematic block diagram of an apparatus 800 according to an embodiment of the present disclosure. For example, the apparatus 800 may be a mobile phone, a computer, a digital broadcast terminal, a messaging device, a gaming console, a tablet device, a medical device, exercise equipment, a personal digital assistant or the like.

Referring to FIG. 8, the apparatus 800 may include one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the apparatus 800, such as the operations associated with display, telephone calls, data communications, camera operations and recording operations. The processing component 802 may include one or more processors 820 to execute instructions to perform all or some of the steps in the above method for generating a correction function. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia data while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800. The sensor component 814 may also detect a change in position of the apparatus 800 or a component of the apparatus 800, presence or absence of user's contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, 4G LTE, 6G NR or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method for generating a correction function.

In an embodiment, there is also provided a non-transitory computer-readable storage medium including instructions, such as included in the memory 804, executable by the processor 820 in the apparatus 800, for performing the above XX method. For example, the non-transitory computer-readable storage medium may be a ROM, a RAM, a CD-ROM, a magnetic tape, a floppy disc, an optical data storage device or the like.

Figure 9:
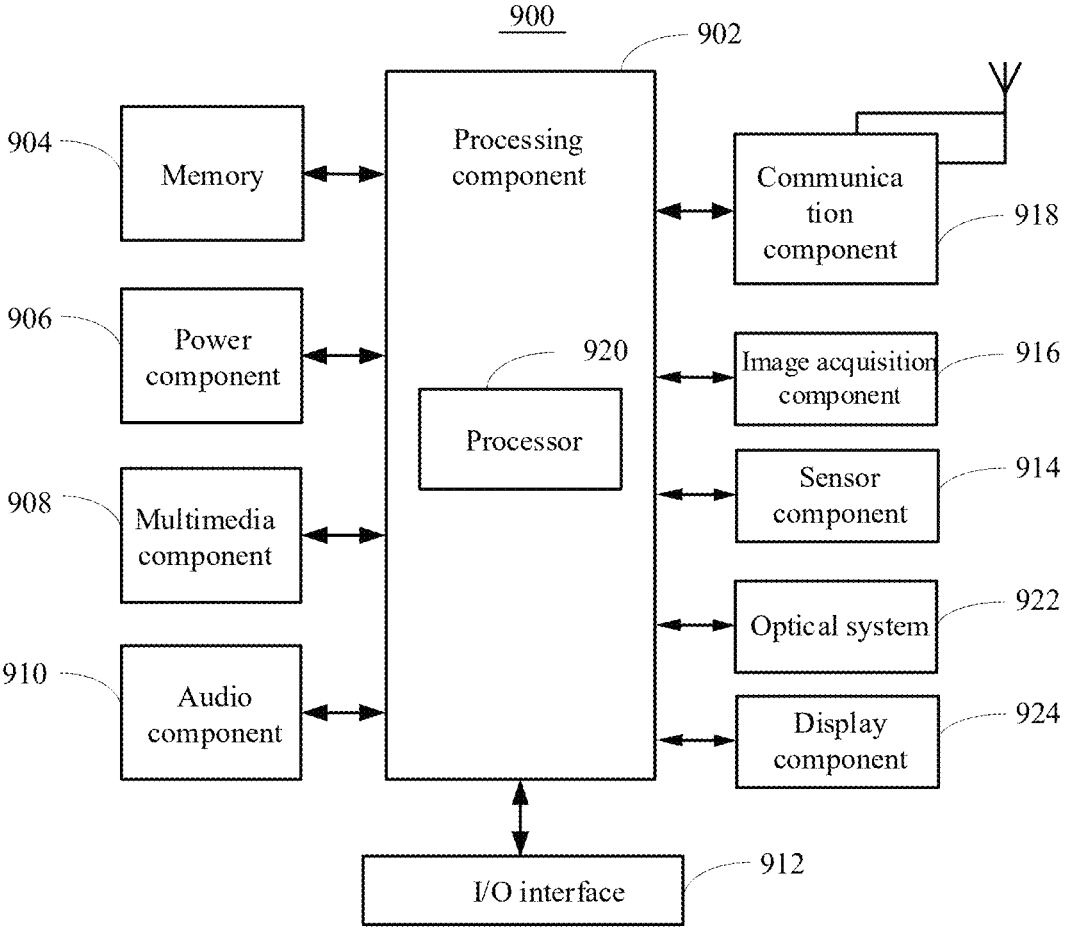
FIG. 9 is a schematic block diagram of an image correction apparatus according to an embodiment of the present disclosure.

FIG. 9 s a schematic block diagram of an image correction apparatus 900 according to an embodiment of the present disclosure. For example, the apparatus 900 may be a mobile phone, a computer, a digital broadcast terminal, a messaging device, a gaming console, a tablet device, a medical device, exercise equipment, a personal digital assistant or the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, a communication component 916, an optical system 922 and a display component 924.

The display component 924 is used to display an image, which generates a corresponding virtual image through the optical system 922. When the display component 924 displays a normal image, the optical system 922 will produce distorted virtual image. When the display component 924 displays a pre-distorted image corrected by the image correction method, the optical system 922 will generate a distorted virtual image.

The processing component 902 typically controls overall operations of the apparatus 900, such as the operations associated with display, telephone calls, data communications, camera operations and recording operations. The processing component 902 may include one or more processors 920 to execute instructions to perform all or some of the steps in the image correction method. Moreover, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900. The sensor component 914 may further detect a change in position of the apparatus 900 or a component of the apparatus 900, presence or absence of user's contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor or a temperature sensor.

The communication component 916 is configured to facilitate communication, wired or wirelessly, between the apparatus 900 and other devices. The apparatus 900 can access a wireless network based on a communication standard, such as WiFi, 2G, or 3G, 4G LTE, 6G NR or a combination thereof. In one embodiment, the communication component 916 receives a broadcast signal or broadcast associated information from an external broadcast management system via a broadcast channel. In one embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the image correction method.

In an embodiment, there is also provided a non-transitory computer-readable storage medium including instructions, such as included in the memory 904, executable by the processor 920 in the apparatus 900, for performing the image correction method. For example, the non-transitory computer-readable storage medium may be a ROM, a RAM, a CD-ROM, a magnetic tape, a floppy disc, an optical data storage device or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

It should be noted that in this article, relational terms such as first and second are only used to distinguish one entity or operation from another entity or operation, and do not necessarily require or imply any actual relationship or order between these entities or operations. The terms "including", "comprising", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including one . . . " do not exclude the existence of other identical elements in the process, method, item, or equipment that includes the said elements.

The above provides a detailed introduction to the methods and apparatuses provided in the embodiments of the present disclosure. Specific examples are applied in this article to explain the principles and implementations of the present disclosure. The explanations of the above embodiments are only used to help understand the methods and core ideas of the present disclosure; meanwhile, for ordinary skilled in the art, there may be changes in specific implementations and application scope based on the ideas of the present disclosure. Accordingly, the content of this specification should not be understood as a limitation of the present disclosure.

The invention claimed is:

1. A method, comprising:

obtaining sample object-side position coordinates and corresponding sample image-side field-of-view-angle coordinates for a display device comprising an optical system and a display component, wherein, when an image is displayed via the optical system, the image is distorted to form a distorted image and the distorted image is displayed on the display component, the distorted image being a virtual image, wherein the sample object-side position coordinates represent positions of sample pixels of the image in the display component, and the sample image-side field-of-view-angle coordinates represent field-of-view angles of sample virtual image points in the distorted image corresponding to the sample pixels; and generating a correction function based on the sample object-side position coordinates and the sample image-side field-of-view-angle coordinates, the correction function being used to correct the distorted image by pre-distorting the image so that the distorted image appears normal;

wherein generating the correction function comprising:

representing the sample object-side position coordinates as a binary polynomial of the sample image-side field-of-view-angle coordinates, wherein the binary polynomial contains polynomial coefficients; and determining values of the polynomial coefficients.

2. The method according to claim 1, wherein obtaining the sample object-side position coordinates and the sample image-side field-of-view-angle coordinates for the display device comprising:

determining the positions of the sample pixels and the field-of-view angles of the sample virtual image points based on optical parameters of the optical system; or, capturing the distorted image by a camera; calculating a field-of-view-angle of the sample virtual image points based on parameters of the camera, determining the sample pixels, and calculating the positions of the sample pixels using parameters of the display component.

3. A method, comprising:

determining color values and image-side field-of-view-angle coordinates of pixels in a target image, wherein the image-side field-of-view-angle coordinates represent field-of-view angles of virtual image points corresponding to the pixels, and a virtual image comprising the virtual image points is formed through an optical system of a display device when a display component of the display device displays the target image;

determining object-side position coordinates corresponding to the image-side field-of-view-angle coordinates based on a correction function; and controlling the display component to display the color values of the pixels according to the object-side position coordinates;

wherein the method further comprises:

obtaining sample object-side position coordinates and corresponding sample image-side field-of-view-angle coordinates for the display device, wherein, when an image is displayed via the optical system, the image is distorted to form a distorted image and the distorted image is displayed on the display component, the distorted image being a sample virtual image, wherein the sample object-side position coordinates represent positions of sample pixels of the image in the display component, and the sample image-side field-of-view-angle coordinates represent field-of-view angles of sample virtual image points in the distorted image corresponding to the sample pixels; and generating the correction function based on the sample object-side position coordinates and the sample image-side field-of-view-angle coordinates, the correction function being used to correct the distorted image by pre-distorting the image so that the distorted image appears normal;

wherein generating the correction function comprises:

representing the sample object-side position coordinates as a binary polynomial of the sample image-side field-of-view-angle coordinates, wherein the binary polynomial contains polynomial coefficients; and determining values of the polynomial coefficients.

4. The method according to claim 3, wherein determining the image-side field-of-view-angle coordinates comprises:

determining a scaling ratio between a display range of the display component and an imaging range of the optical system;

determining virtual image points corresponding to the pixels within the imaging range based on the scaling ratio; and determining the field-of-view angles of the virtual image points.

5. The method according to claim 4, further comprising:

determining an optical origin of the optical system and a display origin of the display component, wherein the optical origin, the display origin, and an observation point of the optical system are all located on an optical axis of the display device;

determining a first maximum field-of-view-angle of a first edge point farthest from the optical origin in the optical system and a first maximum distance between the first edge point and the optical origin;

determining a second maximum distance between a second edge point in the display component that is farthest from the display origin and the display origin; and calculating a second maximum field-of-view-angle of the second edge point based on a geometric relationship between the optical system and the display component, according to the first maximum field-of-view-angle, the first maximum distance, and the second maximum distance, wherein the second maximum field-of-view-angle is used to represent the display range of the display component.

6. The method according to claim 3, wherein determining the color values and the image-side field-of-view-angle coordinates comprises:

determining key pixels in the target image, and determining the color values and image-side field-of-view-angle coordinates of each of the key pixels.

7. The method according to claim 6, wherein determining the key pixels comprises:

randomly selecting a plurality of key pixels in the target image; or, selecting a plurality of key pixels sequentially in the target image at a preset field-of-view-angle interval or at a preset distance interval.

8. The method according to claim 6, wherein all of the pixels in the target image comprises non-key pixels or the key pixels, wherein determining the object-side position coordinates comprises: determining the object-side position coordinates corresponding to the image-side field-of-view-angle coordinates of the key pixels based on the correction function; and determining image-side field-of-view-angle coordinates and corresponding object-side position coordinates of the non-key pixels using an interpolation algorithm; or, wherein the method further comprises: determining color values of the non-key pixels based on the color values of the key pixels using an interpolation algorithm.

9. The method according to claim 3, wherein determining the object-side position coordinates comprises:

substituting the image-side field-of-view-angle coordinates into the correction function, and determining corresponding object-side position coordinates by solving the correction function.

10. A non-transitory computer-readable storage medium on which a computer program is stored, wherein when the computer program is executed by a processor, the method according to claim 1 is implemented.

11. The method according to claim 3, wherein determining the color values and the image-side field-of-view-angle coordinates comprises:

determining the color values and the image-side field-of-view-angle coordinates of each pixel in the target image.

12. The method according to claim 3, wherein determining the object-side position coordinates comprises:

retrieving by query object-side position coordinates corresponding to the image-side field-of-view-angle coordinates from an object-image mapping table, wherein the object-image mapping table is obtained by calculation according to the correction function and preset image-side field-of-view-angle data.

13. A non-transitory computer-readable storage medium on which a computer program is stored, wherein when the computer program is executed by a processor, the method according to claim 3 is implemented.

14. A method, comprising:

determining color values and image-side field-of-view-angle coordinates of pixels in a target image, wherein the image-side field-of-view-angle coordinates represent field-of-view angles of virtual image points corresponding to the pixels, and a virtual image comprising the virtual image points is formed through an optical system of a display device when a display component of the display device displays the target image;

determining object-side position coordinates corresponding to the image-side field-of-view-angle coordinates based on a correction function; and controlling the display component to display the color values of the pixels according to the object-side position coordinates;

wherein the method further comprises:

obtaining sample object-side position coordinates and corresponding sample image-side field-of-view-angle coordinates for the display device, wherein, when an image is displayed via the optical system, the image is distorted to form a distorted image and the distorted image is displayed on the display component, the distorted image being a sample virtual image, wherein the sample object-side position coordinates represent positions of sample pixels of the image in the display component, and the sample image-side field-of-view-angle coordinates represent field-of-view angles of sample virtual image points in the distorted image corresponding to the sample pixels; and generating the correction function based on the sample object-side position coordinates and the sample image-side field-of-view-angle coordinates, the correction function being used to correct the distorted image by pre-distorting the image so that the distorted image appears normal;

wherein determining the image-side field-of-view-angle coordinates comprises:

determining a scaling ratio between a display range of the display component and an imaging range of the optical system;

determining virtual image points corresponding to the pixels within the imaging range based on the scaling ratio; and determining the field-of-view angles of the virtual image points.

15. The method according to claim 14, further comprising:

determining an optical origin of the optical system and a display origin of the display component, wherein the optical origin, the display origin, and an observation point of the optical system are all located on an optical axis of the display device;

determining a first maximum field-of-view-angle of a first edge point farthest from the optical origin in the optical system and a first maximum distance between the first edge point and the optical origin;

determining a second maximum distance between a second edge point in the display component that is farthest from the display origin and the display origin; and calculating a second maximum field-of-view-angle of the second edge point based on a geometric relationship between the optical system and the display component, according to the first maximum field-of-view-angle, the first maximum distance, and the second maximum distance, wherein the second maximum field-of-view-angle is used to represent the display range of the display component.

16. The method according to claim 14, wherein determining the color values and the image-side field-of-view-angle coordinates comprises:

determining key pixels in the target image, and determining the color values and image-side field-of-view-angle coordinates of each of the key pixels.

17. The method according to claim 16, wherein determining the key pixels comprises:

randomly selecting a plurality of key pixels in the target image; or, selecting a plurality of key pixels sequentially in the target image at a preset field-of-view-angle interval or at a preset distance interval.

18. The method according to claim 16, wherein all of the pixels in the target image comprises non-key pixels or the key pixels, wherein determining the object-side position coordinates comprises: determining the object-side position coordinates corresponding to the image-side field-of-view-angle coordinates of the key pixels based on the correction function; and determining image-side field-of-view-angle coordinates and corresponding object-side position coordinates of the non-key pixels using an interpolation algorithm; or, wherein the method further comprises: determining color values of the non-key pixels based on the color values of the key pixels using an interpolation algorithm.

19. The method according to claim 14, wherein determining the object-side position coordinates comprises:

substituting the image-side field-of-view-angle coordinates into the correction function, and determining corresponding object-side position coordinates by solving the correction function".

\* \* \* \* \*